(12) United States Patent
Aull et al.

(10) Patent No.: US 9,377,874 B2
(45) Date of Patent: Jun. 28, 2016

(54) GESTURE RECOGNITION LIGHT AND VIDEO IMAGE PROJECTOR

(75) Inventors: Kenneth W. Aull, Fairfax, VA (US); H Keith Nishihara, Los Altos, CA (US); Shi-Ping Hsu, Pasadena, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 2644 days.

(21) Appl. No.: 11/934,580

(22) Filed: Nov. 2, 2007

(65) Prior Publication Data

US 2009/0115721 A1   May 7, 2009

(51) Int. Cl.
| | |
|---|---|
| G06F 5/00 | (2006.01) |
| G06F 3/03 | (2006.01) |
| G06F 3/01 | (2006.01) |
| G06F 3/042 | (2006.01) |

(52) U.S. Cl.
CPC .............. *G06F 3/0325* (2013.01); *G06F 3/017* (2013.01); *G06F 3/0425* (2013.01)

(58) Field of Classification Search
CPC ...... G06F 3/025; G06F 3/0425; G06F 3/0173
USPC ......................................... 345/156, 173, 179
See application file for complete search history.

(56) References Cited

U.S. PATENT DOCUMENTS

| | | |
|---|---|---|
| 4,468,694 A | 8/1984 | Edgar |
| 4,843,568 A | 6/1989 | Krueger et al. |
| 4,924,506 A | 5/1990 | Crossley et al. |
| 5,220,441 A | 6/1993 | Gerstenberger |
| 5,239,373 A | 8/1993 | Tang et al. |
| 5,475,422 A | 12/1995 | Mori et al. |
| 5,483,261 A | 1/1996 | Yasutake |
| 5,563,988 A | 10/1996 | Maes et al. |
| 5,913,727 A | 6/1999 | Ahdoot |

(Continued)

FOREIGN PATENT DOCUMENTS

| | | |
|---|---|---|
| DE | 197 39 285 C1 | 11/1998 |
| EP | 0 571 702 A2 | 12/1993 |

(Continued)

OTHER PUBLICATIONS

William Daniel Hillis, et al.: "*Gesture Recognition Simulation System and Method*"; U.S. Appl. No. 11/485,790, filed Jul. 13, 2006.

(Continued)

*Primary Examiner* — William Boddie
*Assistant Examiner* — Leonid Shapiro
(74) *Attorney, Agent, or Firm* — Tarolli, Sundheim, Covell & Tummino LLP

(57) ABSTRACT

A system and method is provided for a gesture recognition interface system. The system comprises a projector configured to project colorless light and visible images onto a background surface. The projection of the colorless light can be interleaved with the projection of the visible images. The system also comprises at least one camera configured to receive a plurality of images based on a reflected light contrast difference between the background surface and a sensorless input object during projection of the colorless light. The system further comprises a controller configured to determine a given input gesture based on changes in relative locations of the sensorless input object in the plurality of images, and being further configured to initiate a device input associated with the given input gesture.

20 Claims, 5 Drawing Sheets

(56) References Cited

U.S. PATENT DOCUMENTS

| | | | |
|---|---|---|---|
| 5,999,185 A | 12/1999 | Kato et al. | |
| 6,002,808 A | 12/1999 | Freeman | |
| 6,128,003 A | 10/2000 | Smith et al. | |
| 6,147,678 A | 11/2000 | Kumar et al. | |
| 6,195,104 B1 | 2/2001 | Lyons | |
| 6,204,852 B1 | 3/2001 | Kumar et al. | |
| 6,222,465 B1 | 4/2001 | Kumar et al. | |
| 6,327,381 B1 | 12/2001 | Rogina et al. | |
| 6,339,748 B1 | 1/2002 | Hiramatsu | |
| 6,353,428 B1 | 3/2002 | Maggioni et al. | |
| 6,359,612 B1* | 3/2002 | Peter et al. | 345/156 |
| 6,434,255 B1 | 8/2002 | Harakawa | |
| 6,512,507 B1 | 1/2003 | Furihata et al. | |
| 6,618,076 B1* | 9/2003 | Sukthankar et al. | 348/180 |
| 6,624,833 B1 | 9/2003 | Kumar et al. | |
| 6,681,031 B2 | 1/2004 | Cohen et al. | |
| 6,695,770 B1 | 2/2004 | Choy et al. | |
| 6,714,901 B1 | 3/2004 | Cotin et al. | |
| 6,720,949 B1 | 4/2004 | Pryor et al. | |
| 6,788,809 B1 | 9/2004 | Grzeszczuk et al. | |
| 6,796,656 B1 | 9/2004 | Dadourian | |
| 6,806,849 B2 | 10/2004 | Sullivan | |
| 6,857,746 B2 | 2/2005 | Dyner | |
| 6,950,534 B2 | 9/2005 | Cohen et al. | |
| 6,956,573 B1 | 10/2005 | Bergen et al. | |
| 6,983,065 B1 | 1/2006 | Akgul et al. | |
| 7,042,440 B2 | 5/2006 | Pryor et al. | |
| 7,129,927 B2 | 10/2006 | Mattsson | |
| 7,259,747 B2 | 8/2007 | Bell | |
| 7,701,439 B2 | 4/2010 | Hillis et al. | |
| 2001/0006426 A1 | 7/2001 | Son et al. | |
| 2001/0043719 A1 | 11/2001 | Harakawa et al. | |
| 2002/0090146 A1 | 7/2002 | Heger et al. | |
| 2002/0093666 A1* | 7/2002 | Foote et al. | 356/621 |
| 2002/0122113 A1 | 9/2002 | Foote | |
| 2002/0126161 A1 | 9/2002 | Kuzunuki et al. | |
| 2002/0186221 A1 | 12/2002 | Bell | |
| 2003/0058341 A1 | 3/2003 | Brodsky et al. | |
| 2003/0067537 A1 | 4/2003 | Myers | |
| 2003/0085866 A1 | 5/2003 | Bimber | |
| 2003/0156756 A1 | 8/2003 | Gokturk et al. | |
| 2003/0218761 A1 | 11/2003 | Tomasi et al. | |
| 2004/0046747 A1 | 3/2004 | Bustamante | |
| 2004/0108990 A1 | 6/2004 | Lieberman et al. | |
| 2004/0113885 A1 | 6/2004 | Genc et al. | |
| 2004/0125207 A1 | 7/2004 | Mittal et al. | |
| 2004/0183775 A1 | 9/2004 | Bell | |
| 2004/0193413 A1 | 9/2004 | Wilson et al. | |
| 2004/0239761 A1 | 12/2004 | Jin et al. | |
| 2005/0002074 A1 | 1/2005 | McPheters et al. | |
| 2005/0012817 A1 | 1/2005 | Hampapur et al. | |
| 2005/0052714 A1 | 3/2005 | Klug et al. | |
| 2005/0068537 A1 | 3/2005 | Han et al. | |
| 2005/0088714 A1 | 4/2005 | Kremen | |
| 2005/0110964 A1 | 5/2005 | Bell et al. | |
| 2005/0151850 A1* | 7/2005 | Ahn et al. | 348/207.99 |
| 2005/0166163 A1 | 7/2005 | Chang et al. | |
| 2005/0275628 A1 | 12/2005 | Balakrishnan et al. | |
| 2005/0285945 A1 | 12/2005 | Usui et al. | |
| 2005/0286101 A1 | 12/2005 | Garner et al. | |
| 2006/0010400 A1 | 1/2006 | Dehlin et al. | |
| 2006/0036944 A1 | 2/2006 | Wilson | |
| 2006/0052953 A1* | 3/2006 | Vilanova et al. | 702/32 |
| 2006/0092178 A1 | 5/2006 | Tanguay | |
| 2006/0125799 A1 | 6/2006 | Hillis et al. | |
| 2006/0187196 A1 | 8/2006 | Underkoffler et al. | |
| 2006/0192755 A1 | 8/2006 | Blythe et al. | |
| 2006/0203363 A1 | 9/2006 | Levy-Rosenthal | |
| 2006/0209021 A1 | 9/2006 | Yoo et al. | |
| 2007/0024590 A1 | 2/2007 | Krepec | |
| 2007/0064092 A1 | 3/2007 | Sandbeg et al. | |
| 2008/0013793 A1* | 1/2008 | Hillis et al. | 382/114 |
| 2008/0028325 A1 | 1/2008 | Ferren et al. | |
| 2008/0043106 A1 | 2/2008 | Hassapis et al. | |
| 2008/0136973 A1* | 6/2008 | Park | 348/744 |
| 2008/0150913 A1* | 6/2008 | Bell et al. | 345/175 |
| 2008/0244468 A1 | 10/2008 | Nishihara et al. | |
| 2009/0015791 A1* | 1/2009 | Chang et al. | 353/6 |
| 2009/0103780 A1 | 4/2009 | Nishihara et al. | |
| 2009/0116742 A1 | 5/2009 | Nishihara | |
| 2009/0316952 A1 | 12/2009 | Ferren et al. | |
| 2010/0050133 A1 | 2/2010 | Nishihara et al. | |

FOREIGN PATENT DOCUMENTS

| | | |
|---|---|---|
| EP | 0 571 702 A3 | 12/1993 |
| EP | 0 913 790 A1 | 5/1999 |
| EP | 1 223 537 A2 | 12/2001 |
| EP | 1 689 172 A1 | 8/2006 |
| EP | 1 879 129 A1 | 1/2008 |
| EP | 1 879 130 A2 | 1/2008 |
| EP | 2 056 185 A2 | 5/2009 |
| EP | 2 068 230 A2 | 6/2009 |
| GB | 2460937 A | 12/2009 |
| JP | 62264390 A | 1/1987 |
| JP | 4271423 A | 2/1991 |
| JP | 04031996 A | 2/1992 |
| WO | WO 98/13746 | 4/1998 |
| WO | WO 00/02187 A1 | 1/2000 |
| WO | WO 00/21023 A1 | 4/2000 |
| WO | WO 00/55802 A | 9/2000 |
| WO | WO 03/026299 A1 | 3/2003 |
| WO | WO 2004/091956 A2 | 10/2004 |
| WO | WO 2005/0573978 A2 | 6/2005 |
| WO | WO 2008/001202 A3 | 1/2008 |

OTHER PUBLICATIONS

William Daniel Hillis, et al.: "Gesture Recognition Interface System"; U.S. Appl. No. 11/485,788, filed Jul. 13, 2006.

Bretzner, et al.: "Hand Gesture Recognition Using Multi-Scale Colour Features, Hierarchical Models and Particle Filtering"; Automatic Face and Gesture Recognition, 2002, Proceedings. Fifth IEEE International Conference on, IEEE, Piscataway, NJ, USA, May 20, 2002, pp. 423-428, XP010949393, ISBN: 978-0-7695-1602-8, p. 2.

British Search Report for corresponding GB 0909597.7 completed Sep. 17, 2009.

British Search Report for corresponding GB0910067.8, completed Oct. 15, 2009.

DE Office Action for corresponding DE 10 2009 043 798.3, issued Nov. 10, 2010.

Dubois, et al.: "In Vivo Measurement of Surgical Gestures"; IEEE Transactions on Biochemical Engineering, vol. 49, No. 1, Jan. 2002, pp. 49-54.

EP Search Report for corresponding EP 07 25 2716, completed Jun. 4, 2010.

EP Search Report for corresponding EP 07 25 2870 completed Aug. 16, 2010 by Suphi Umut Naci of the Hague.

European Search Report for corresponding EP 07 25 2717 completed Sep. 27, 2007 by Martin Müller of the EPO.

Fiorentino, et al.: "Spacedesign: A Mixed Reality Workspace for Aesthetic Industrial Design"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col., ¶4; p. 87, left-hand col., ¶4-right-hand col.

German Office Action for corresponding DE 10 2009 034 413.6-53, issued Sep. 29, 2010.

Hartley, et al.: "Multiple View Geometry in Computer Vision, Structure Computation"; Jul. 31, 2000, Multiple View Geometry in Computer Vision, Cambridge University Press, GB, pp. 295-311, XP002521742, ISBN: 9780521623049, pp. 295-311, figures 11.1, 11.2 & 11.7.

Ishibuci, et al.: "Real Time Hand Gesture Recognition Using 3D Prediction Model"; Proceedings of the International Conference on Systems, Man and Cybernetics. Le Touquet, Oct. 17-20, 1993; New York, IEEE, US LNKD-DOI: 10.1109/ICSMC.1993.390870, vol. -, Oct. 17, 1993, pp. 324-328, XP010132504, ISBN: 978-0-7803-0911-1, pp. 325; figures 1-4.

(56) References Cited

OTHER PUBLICATIONS

Kjeldsen, et al.: "Toward the Use of Gesture in Traditional User Interfaces"; Automatic Face and Gesture Recognition, 1996, Proceedings of the Second International Conference on Killington, VT, USA 14-16 Oct. 14, 1996' Los Alamitos, CA, USA, IEEE Comput. Soc., ISBN 978-0-8186-7713-7; whole document.
Korida, K et al: "An Interactive 3D Interface for a Virtual Ceramic Art Work Environment"; Virtual Systems and Multimedia, 1997. VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.
Leibe, et al.: "Toward Spontaneous Interaction with the Perceptive Workbench"; IEEE Computer Graphics and Applications; p. 54-65XP-000969594; Nov./Dec. 2000.
Mitchell: "Virtual Mouse"; IP.COM Inc, West Henrietta, NY, US, May 1, 1992, ISSN 1533-0001; whole document.
Office Action for corresponding DE 10 2009 025 236.3, issued May 2010.
Pajares, et al.: "Usability Analysis of a Pointing Gesture Interface"; Systems, Man and Cybernetic, 2004 IEEE International Conference on , Oct. 10, 2004, ISBN 978-0-7803-8566-5; see e.g. sections 2.1 and 4.
Pavlovic, et al.: "Visual Interpretation of Hand Gestures for Human-Computer Interaction: A Review"; Jul. 1, 1997, IEEE Transactions on Pattern Analysis and Machine Intelligence, IEEE Service Center, Los Alamitos, CA, US LNKD-DOI: 10.1109/34.598226, pp. 677-695, XP000698168, ISSN: 0162-8828, pages. 14-16, figure 5.
Plesniak, W et al.: "Spatial Interaction with Haptic Holograms"; Multimedia Computing and Systems, 1999, IEEE International Conference on Florence, Italy Jun. 7-11, 1999, Los Alamitos, CA USA, IEEE Comput. Soc. US, vol. 1, Jun. 7, 1999, pp. 413-426, XP010342817 ISBN: 0-7695-0253-9; Abstract, Figs. 7, 8.
Rehg: "visual Analysis of High DOF Articulated Objects with Application to Hand Tracking"; [online] 1995, XP002585209, School of Computer Science Carnegie Mellon University, Retrieved from the internet: URL: http//www.dtoc/,o;/cgi-bin/GetTRDoc?AD=ADA306677&Location=U2&doc=GetRDoc.pdf> [retrieved on May 25, 2010], p. 1, 28, 31.
Sato, Y et al.: "Real-Time Input of 3D Pose and Gestures of a User's Hand and Its Applications for HCI"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.
Search Report for corresponding British application No. GB0917797.3; completed Jan. 28, 2010 by Mr. Jeremy Cowen.
Search Report for corresponding GB 0715481.8, Date of Search: Nov. 27, 2007.
Search Report for corresponding GB 0913330.7; Completed Nov. 3, 2009 by Dr. Russell Maurice.
Sonka, et al.: "Image Processing, Analysis, and Machine Vision Second Edition"; Sep. 30, 1998, Thomson, XP002585208, ISBN: 053495393X, p. v-xii, p. 82-89.
Sutcliffe, et al.: "Presence, Memory and Interaction in Virtual Environments"; International Journal of Human-Computer Studies, 62 (2005), pp. 307-327.
Vámossy, et al.: "Virtual Hand—Hand Gesture Recognition System"; SISY 2007, 5th International Symposium on Intelligent Systems and Informatics, Aug. 24-25, 2007, Subolica, Serbia, IEEE, p. 97-102.
European Search Report for corresponding EP 08 01 8146 completed May 15, 2012.

* cited by examiner

GESTURE RECOGNITION LIGHT AND VIDEO IMAGE PROJECTOR

TECHNICAL FIELD

The present invention relates generally to interface systems, and specifically to a gesture recognition light and video image projector.

BACKGROUND

As the range of activities accomplished with a computer increases, new and innovative ways to provide an interface with a computer are often developed to complement the changes in computer functionality and packaging. For example, touch sensitive screens can allow a user to provide inputs to a computer without a mouse and/or a keyboard, such that desk area is not needed to operate the computer. Examples of touch sensitive screens include pressure sensitive membranes, beam break techniques with circumferential light sources and sensors, and acoustic ranging techniques. However, these types of computer interfaces can only provide information to the computer regarding the touch event, itself, and thus can be limited in application. In addition, such types of interfaces can be limited in the number of touch events that can be handled over a given amount of time, and can be prone to interpret unintended contacts, such as from a shirt cuff or palm, as touch events. Furthermore, touch sensitive screens can be prohibitively expensive and impractical for very large display sizes, such as those used for presentations.

Some interfaces can include imaging equipment to capture silhouette images that correspond to inputs. Such interfaces may include one or more light sources that provide the light to generate the silhouette images against a background. The source or sources of the light may need to be precisely located, and such interfaces typically require a manual calibration step that can be lengthy and can include additional equipment. As a result, such an interface can be expensive, and a setup time for the interface can be complicated and can require a high degree of precision. Furthermore, any change in the interface system (e.g., unintended bump) requires an additional manual calibration.

SUMMARY

A system and method is provided for a gesture recognition interface system. The system comprises a projector configured to project colorless light and visible images onto a background surface. The projection of the colorless light can be interleaved with the projection of the visible images. The system also comprises at least one camera configured to receive a plurality of images based on a reflected light contrast difference between the background surface and a sensorless input object during projection of the colorless light. The system further comprises a controller configured to determine a given input gesture based on changes in relative locations of the sensorless input object in the plurality of images, and being further configured to initiate a device input associated with the given input gesture.

Another embodiment of the present invention includes a method of providing device inputs. The method comprises projecting non-visible light interleaved with visible images onto a background surface and providing simulated inputs over the background surface via gestures associated with a sensorless input object. The method also comprises generating a plurality of images associated with the sensorless input object based on a reflected light contrast between the sensorless input object and the non-visible light. The method also comprises determining a plurality of three-dimensional physical locations of the sensorless input object relative to the background surface, and determining if changes in the plurality of three-dimensional physical locations of the sensorless input object correspond to a given one of a plurality of predefined gestures. The method further comprises providing at least one device input based on determining that the changes in the plurality of three-dimensional physical locations of the sensorless input object correspond to the given one of the plurality of predefined gestures.

Another embodiment of the present invention includes a gesture recognition interface system. The system comprises means for projecting non-visible light interleaved with visible images onto a background surface, and means for generating a plurality of images of a sensorless input object based on a brightness contrast between the background surface and the sensorless input object. The system also comprises means for generating three-dimensional location information associated with the sensorless input object based on the plurality of images of the sensorless input object and means for translating changes in the three-dimensional location information associated with the sensorless input object to a given input gesture. The method further comprises means for providing device inputs based on matching the given input gesture with one of a plurality of predefined gestures.

DETAILED DESCRIPTION

Figure 1:
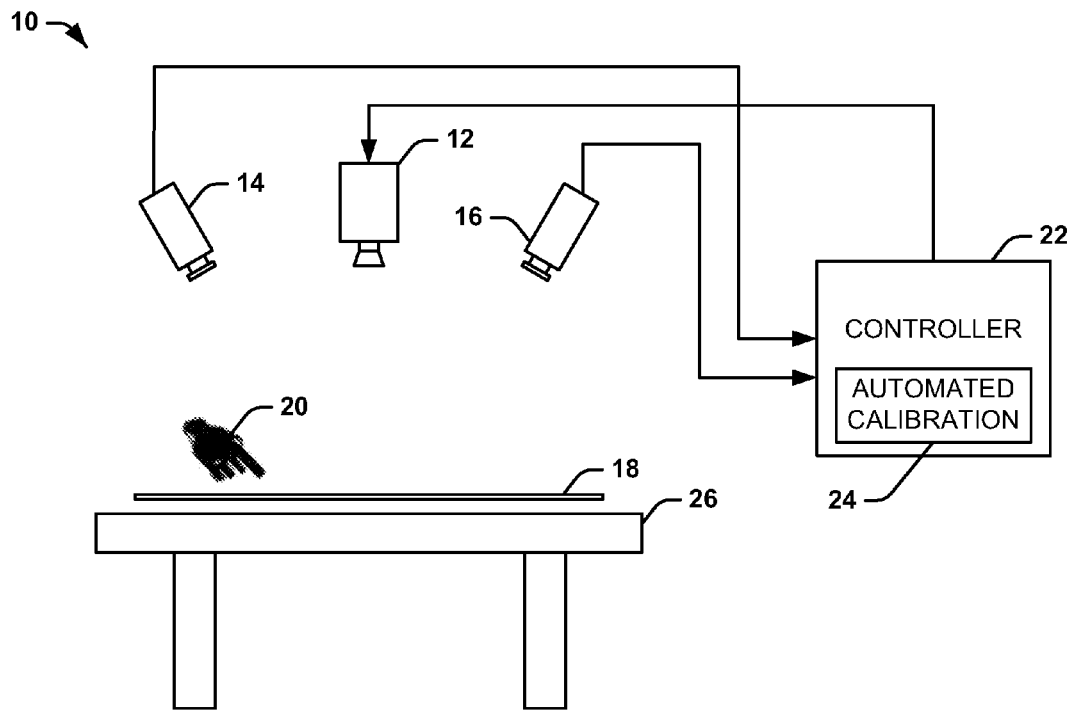
FIG. 1 illustrates an example of a gesture recognition interface system in accordance with an aspect of the invention.

The present invention relates generally to interface systems, and specifically to a gesture recognition light and video image projector. A projector is configured to project a colorless light that is interleaved with visible light images onto a background surface. The background surface can thus be implemented as a display, such as a large projected computer screen. The colorless light can be non-visible light, such as infrared (IR), and thus does not interfere with the visible light images. As an example, the projector can be a digital light projection (DLP) projector that includes a color wheel having both visible light lenses and a lens associated with colorless light.

A user employs a sensorless input object to provide simulated inputs to a computer or other electronic device associated with the visible light images. It is to be understood that the simulated inputs are provided by gestures using the sensorless input object. For example, the user could provide gestures that include motion and/or contact with a background surface using the sensorless input object. The sensorless input object could be, for example, the user's hand; a wand, stylus, pointing stick; or a variety of other devices with which the user can gesture. The simulated inputs could be, for example, simulated mouse inputs.

The colorless light illuminates the sensorless input object and the background surface behind the sensorless input object to generate a plurality of images of the sensorless input object that are captured by at least one camera. For example, the at least one camera can include a pair of stereo cameras. As such, the plurality of images of the sensorless input object could be a plurality of matched pairs of images of the sensorless input object, such that each image of the matched pair corresponds to the sensorless input object from a different perspective at substantially the same time. As another example, the at least one camera can be configured as a single camera that compares the location of the sensorless input object to a predefined pattern that is projected onto background surface. The plurality of images can be employed to determine a three-dimensional location of the sensorless input object, with changes in the location being employed to determine physical motion of the sensorless input object.

A controller can be operative to receive the plurality of images to determine the three-dimensional location information associated with the sensorless input object. The controller could then translate the simulated inputs into device inputs based on the three-dimensional location information. For example, the controller could interpret gesture inputs based on motion associated with the one or more end-points of the sensorless input object and translate the gesture inputs into inputs to a computer or other device. The controller could also compare the motion associated with the sensorless input object with a plurality of predefined gestures stored in a memory, such that a match with a given predefined gesture could correspond to a particular device input.

FIG. 1 illustrates an example of a gesture recognition interface system 10 in accordance with an aspect of the invention. The gesture recognition interface system 10 includes a projector 12, a first camera 14, and a second camera 16. The projector 12 can be configured to project colorless light that is interleaved with visible light images. Colorless light, as described herein, is light that is implemented specifically for gesture recognition, and thus is not implemented for the projection of visible images with which a user of the gesture recognition interface system 10 interacts. The colorless light can be non-visible light, such as infrared (IR) light. As an example, the projector 12 can be a digital light projection (DLP) projector that includes a color wheel having visible light lenses of various colors and an IR lens. The first camera 14 and the second camera 16 may each include an IR filter, such that the respective camera may only be able to receive IR light. The projector 12 illuminates a background surface 18, such as a reflective screen, such that the projected IR light is reflected to the first camera 14 and the second camera 16.

The projector 12 can project the visible light images to provide an output interface, such as, for example, computer monitor data, with which the user can interact and provide inputs. In the example of FIG. 1, the projector 12 can project the monitor data onto the background surface 18. Because the colorless light that is interleaved with the visible light images may be non-visible light, the colorless light may not interfere with the computer monitor data projected from the projector 12. The colorless light is projected from the projector 12 onto the background surface 18 between the projections of the visible light images. As such, during projection of the colorless light, the cameras 14 and 16 can capture images of a sensorless input object 20 in contrast with the colorless light that is reflected from the background surface 18. Thus, a user can simulate inputs by directly interacting with the computer monitor data, such as, for example, to provide mouse inputs, as described in greater detail below.

Figure 2:
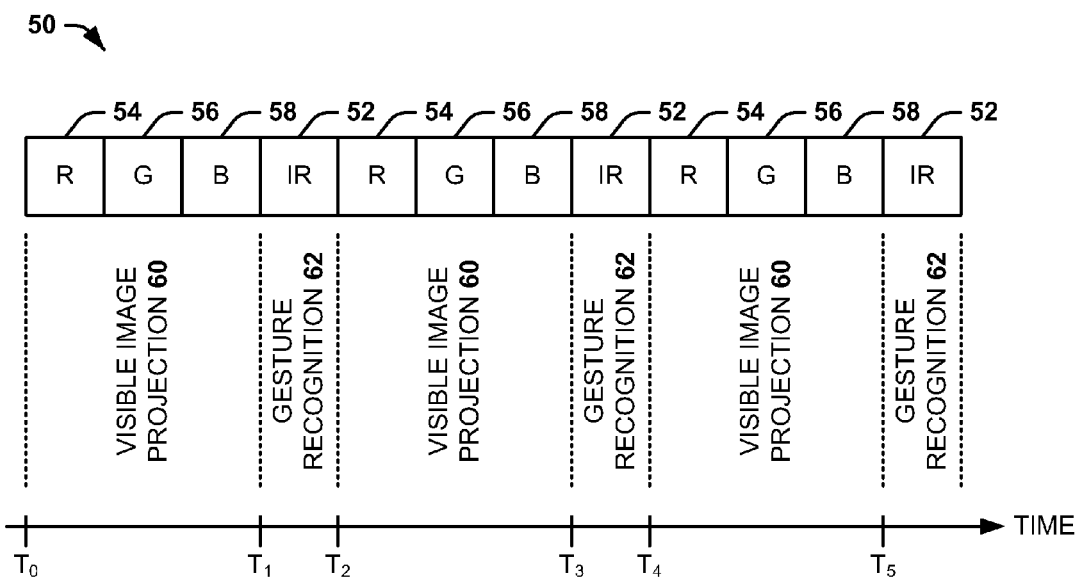
FIG. 2 illustrates an example of a timing diagram associated with a projector in accordance with an aspect of the invention.

FIG. 2 illustrates an example of a timing diagram 50 associated with the projector 12 in accordance with an aspect of the invention. The timing diagram 50 demonstrates the interleaving of colorless light, demonstrated as IR light 52 in the example of FIG. 2, with colored light that is used to project the visible images onto the background surface 18. Specifically, the IR light 52 is interleaved with red light 54, with green light 56, and with blue light 58, demonstrated as "R", "G", and "B", respectively, in the example of FIG. 2. As an example, the projector 12 can be a DLP projector, such that the red light 54, the green light 56, the blue light 58, and the IR light 52 can correspond to colored lenses of a color wheel. Therefore, the projection of the red light 54, the green light 56, the blue light 58, and the IR light 52 can be projected in a repeated sequence.

At a time $T_0$, the projector 12 projects the red light 54, the green light 56, and the blue light 58 in a sequence, with mirrors within the projector 12 reflecting the respective projected light into precise pixel locations onto the background surface 18. At the time $T_1$, the projector 12 stops projecting visible light, the blue light 58 in the example of FIG. 2, and begins to project the IR light 52. Therefore, the time $T_0$ through the time $T_1$ defines a visible image projection period 60. During the visible image projection period 60, the projector 12 projects visible images, such as computer monitor data, onto the background surface 18 with which a user of the gesture recognition interface system 10 can interact.

The projector 12 projects the IR light 52 from the time $T_1$ through a time $T_2$. Therefore, the time $T_1$ through the time $T_2$ defines a gesture recognition period 62. During the gesture recognition period 62, the cameras 14 and 16 each capture an image of the IR light 52 reflected from the background surface 18. As a result, the cameras 14 and 16 can capture images that are based on a light contrast between the sensorless input object 20 and the background surface 18. Specifically, because the cameras 14 and 16 can have an IR filter, they can each be configured to capture a silhouette image of the sensorless input object 20 during the gesture recognition period 62. Therefore, the silhouette images can be determinative of a three-dimensional location of the sensorless input object 20, as described in greater detail below.

At a time $T_2$, another visible image projection period 60 begins, followed by another gesture recognition period 62 beginning at a time $T_3$. Likewise, at a time $T_4$, yet another visible image projection period 60 begins, followed by yet another gesture recognition period 62 beginning at a time $T_5$. Therefore, the projector 12 can continuously alternate between the visible image projection periods 60 and the gesture recognition periods 62. The projection of each of the red light 54, the green light 56, the blue light 58, and the IR light 52 can be for approximately equal amounts of time, and can be very rapid (e.g., approximately 4 milliseconds). Therefore, a user of the gesture recognition interface system 10 may not be able to ascertain any breaks in the visible images that are projected onto the background surface 18 during the gesture recognition periods 62. Accordingly, the projection of the IR light 52 may not interfere with the computer monitor data that is projected onto the background surface 18.

Referring back to the example of FIG. 1, the first camera 14 and the second camera 16 each receive separate silhouette images of the sensorless input object 20, where each of the separate silhouette images received, respectively, by the first camera 14 and the second camera 16 are a matched pair. For example, the first camera 14 and the second camera 16 could be timed to take a photograph each time the projector 12 projects the IR light 52. Therefore, the cameras 14 and 16 could rapidly take still photograph images at, for example, sixty times per second, such that each still photograph image taken by the first camera 14 is matched to a still photograph image taken by the second camera 16 at substantially the same time. The sensorless input object can appear to be in a different location relative to the reflective screen in each silhouette image matched pair captured by each of the first camera 14 and the second camera 16, respectively, due to parallax caused by the different mounted locations of each of the first camera 14 and the second camera 16

The gesture recognition interface system 10 includes a controller 22. As an example, the controller 22 could reside within a computer (not shown) for which the gesture recognition interface system 10 is designed to provide gesture recognition interaction. It is to be understood, however, that the hosting of the controller 22 is not limited to a standalone computer, but could be included in embedded processors. The controller 22 is configured to receive each of the silhouette image pairs that are captured by the cameras 14 and 16 during the gesture recognition period 62 and to determine a three-dimensional location of the sensorless input object 20. The controller 22 can also be configured to correlate three-dimensional motion of the sensorless input object 20 across successive gesture recognition periods 62 as one of a plurality of predefined gestures. The predefined gestures can each correspond to a device input, such as an input to a computer with which the computer monitor data that is projected onto the background surface 18 as the visible light images can be associated. Accordingly, the sensorless input object 20 can be implemented by a user of the gesture recognition interface system 10 to simulate inputs over the background surface 18 that correspond to the device inputs.

As an example, the controller 22 can correlate motion of the sensorless input object 20 across successive gesture recognition periods 62 as two-dimensional motion of an end-point of the sensorless input object 20 across the background surface 18 as a mouse cursor, which can be projected as part of the monitor data by the projector 12. Furthermore, as another example, by determining the three-dimensional physical location of the sensorless input object 20, the controller 22 could interpret a touch of the background surface 18 by the end-point of the sensorless input object 20 as a left mouse-click. Accordingly, a user of the gesture recognition interface system 10 could navigate through a number of computer menus associated with a computer merely by moving his or her fingertip through the air above the background surface 18 and by touching icons projected onto the background surface 18.

As described herein in the example of FIG. 1, the sensorless input object 20 is demonstrated as a user's hand, such that the simulated inputs can be provided through hand gestures. It is to be understood that the use of a hand to provide simulated inputs via hand gestures is but one example implementation of the gesture recognition interface system 10. Examples of other types of sensorless input objects could include a stylus, wand, pointing stick, or any of a variety of devices that could provide gestures to simulate inputs. It is to be further understood that the sensorless input object 20 need not be specially designed or suited for use in the gesture recognition interface system 10. For example, a user's naked hand could be used as the sensorless input object 20. As another example, the user could wear a glove that includes reflective material to provide gesture inputs to the gesture recognition interface system 10.

In the example of FIG. 1, the controller 22 includes an automated calibration unit 24. The automated calibration unit 24 could be a separate system working in conjunction with the controller 22, or could merely be a software routine residing within the controller 22. The automated calibration unit 24 can be configured to calibrate the gesture recognition interface system 10 in a manner that is transparent to the user(s) of the gesture recognition interface system 10. For example, the automated calibration unit 24 can include a timer that is configured to periodically issue a calibration command. Additionally or alternatively, the automated calibration unit 24 can be configured to begin a calibration procedure in response to a user input. For example, upon initial setup of the gesture recognition interface system 10, a user can initiate a calibration procedure to begin using the gesture recognition interface system 10. Subsequently, the automated calibration unit 24 can continuously and periodically calibrate the gesture recognition interface system 10 to account for potential changes in the setup of the gesture recognition interface system 10, such as vibrations, a user unintentionally bumping into a component, and/or any of a variety of other events that could occur and offset the accuracy of the gesture recognition interface system 10.

The calibration of the gesture recognition interface system 10 can be an operation that is software driven within the controller 22 and/or the automated calibration unit 24. For example, upon the initiation of a calibration procedure, the projector 12 be configured to project a predefined calibration pattern onto the background surface 18 during the projection of the colorless light (i.e., during a gesture recognition period 62). As an example, the predefined calibration pattern can include a grid, an array of dots, and/or any of a variety of patterns having distinct and clearly ascertainable features. The location of the features of the predefined calibration pattern can be specifically defined by the automated calibration unit 24. Because the predefined calibration pattern is projected in the colorless light, such that it could be projected in non-visible light (e.g., IR light), the predefined calibration pattern can be invisible with respect to users of the gesture recognition interface system 10. Therefore, the projection of the predefined calibration pattern may not interfere with operation of the gesture recognition interface system 10.

Figure 3:
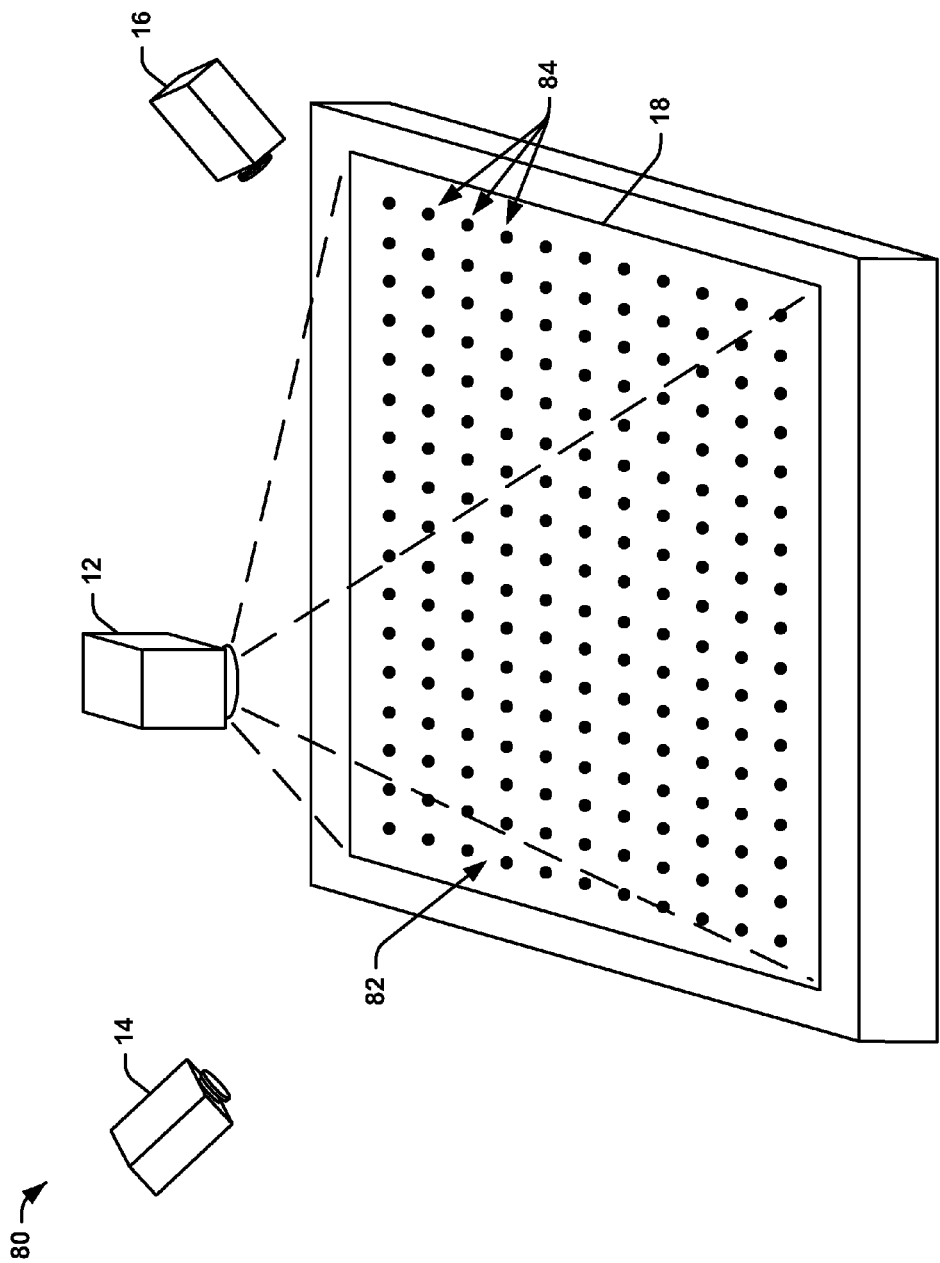
FIG. 3 illustrates an example of a calibration procedure in accordance with an aspect of the invention.

FIG. 3 illustrates an example of a calibration procedure 80 in accordance with an aspect of the invention. The calibration procedure 80 can be implemented in the gesture recognition interface system 10 in the example of FIG. 1. As such, reference is to be made to the example of FIG. 1 in the following discussion of the example of FIG. 3.

The calibration procedure 80 demonstrates an overhead view of the projector 12 projecting a predefined calibration pattern 82 onto the background surface 18. The projection of the predefined calibration pattern 82 can be performed during a gesture recognition period 62, such that the predefined calibration pattern 82 is projected in the colorless light (e.g., IR light). As a result, the predefined calibration pattern 82 can be invisible to users of the gesture recognition interface system 10 as it is being projected onto the background surface 18.

In the example of FIG. 3, the predefined calibration pattern 82 is demonstrated as a plurality of equally spaced dots 84. It is to be understood, however, that the predefined calibration pattern 82 is not limited to the dots 84 demonstrated in the example of FIG. 3, but that any distinct and identifiable pattern may be implemented in the calibration procedure 82. The location of each pixel of each of the dots 84 of the predefined calibration pattern can be specifically defined by the automated calibration unit 24. As an example, mirrors within the projector 12 can reflect the features of the predefined calibration pattern onto the background surface 18 such that the features can be associated with precise pixel locations. The cameras 14 and 16 can each capture images of the projected predefined calibration pattern and provide the images to the controller 22 (not shown in the example of FIG. 3). The controller 22 and/or the automated calibration unit 24 can thus correlate the location of the features of the predefined calibration pattern appearing in the images of the cameras 14 and 16 with the precise pixel locations associated with the mirrors from which the features of the predefined calibration pattern are reflected. Accordingly, specific locations on the background surface 18 can be associated with specific pixel locations of the projected visible images that are projected in the visible image projection periods 60. Therefore, calibration of the gesture recognition interface system 10 is achieved.

The gesture recognition interface system 10 in the example of FIG. 1, as well as the timing diagram 50 in the example of FIG. 2 and the calibration procedure 80 in the example of FIG. 3, are intended to represent but one example of a gesture recognition interface system in accordance with an aspect of the invention. For example, the gesture recognition interface system 10 could include more than two cameras that each supply respective silhouette images of the sensorless input object 20 to the controller 22. Alternatively, the gesture recognition interface system 10 could include a single camera, such that gesture recognition algorithms other than location-based parallax separation of images can be implemented. As an example, the projector 12 could be configured to project a light-strip pattern in the colorless light, such that the single camera can identify location and gestures associated with the sensorless input object 20 based on deformation of the light-strip pattern. Furthermore, in the example of the projector 12 being a DLP projector, it is to be understood that the color wheel is not limited to including red, green, and blue lenses in addition to the colorless (e.g., IR) lens, but could include any of a variety of combinations of colored lenses including the colorless lens.

In addition, the example of FIG. 1 demonstrates that the background surface 18 is mounted on a table 26. It is to be understood that such an arrangement is demonstrated only for the sake of ergonomic concerns, but that the background surface 18 can be placed in a variety of different arrangements for each of the cameras 12 and 14 to be capable of receiving the respective silhouette images of the sensorless input object 20. As a further example, the colorless light is not limited to being IR light, but could instead be illuminated in a different spectrum. As an example, the colorless light could be ultraviolet (UV) or even white light in the visible light spectrum, with each of the respective cameras 14 and 16 having a corresponding spectrum filter. For all of these reasons, the gesture recognition interface system 10 is not limited to the example of FIGS. 1 and 2.

Figure 4:
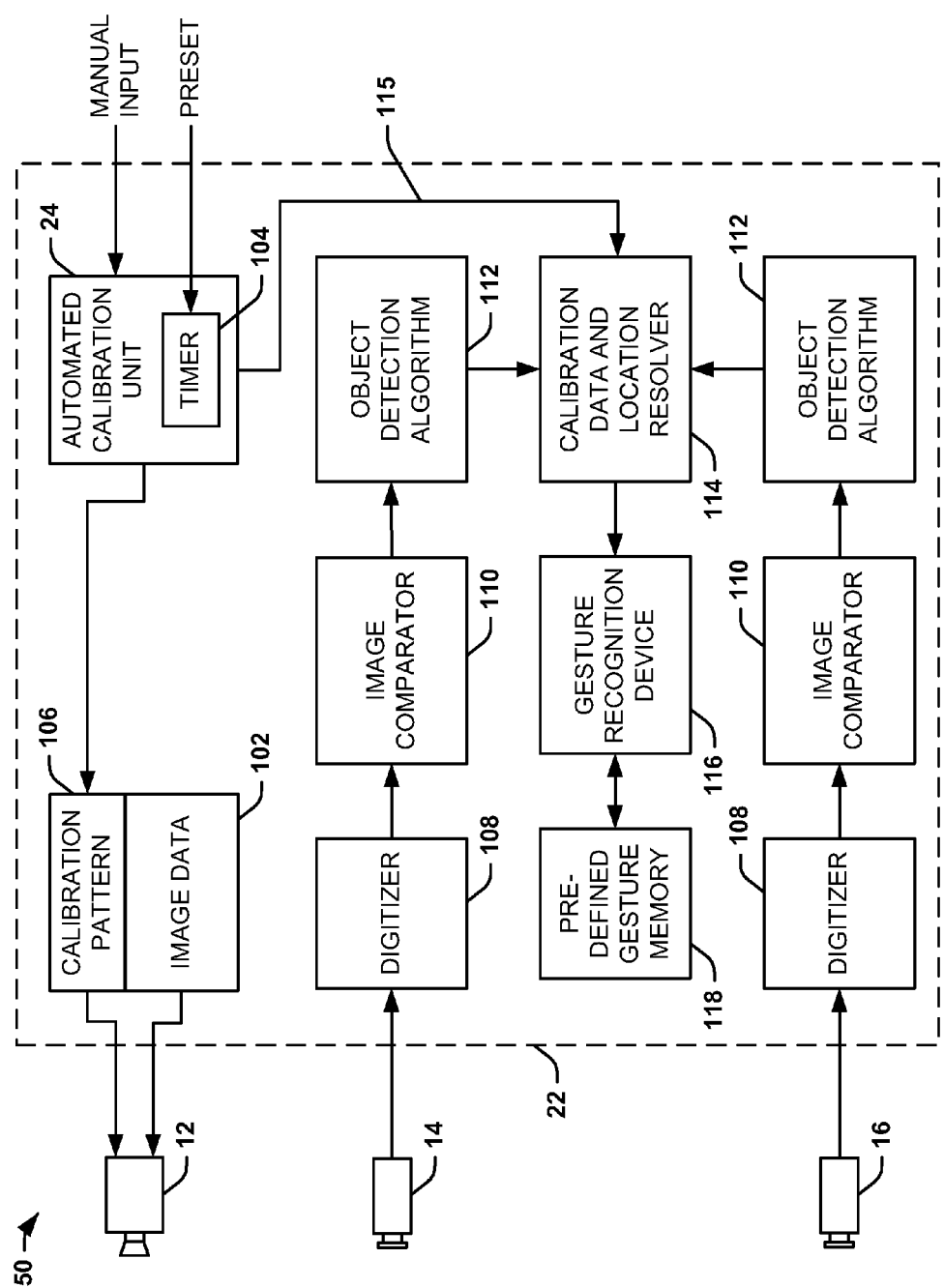
FIG. 4 illustrates another example of a gesture recognition interface system in accordance with an aspect of the invention.

FIG. 4 illustrates another example of a gesture recognition interface system 100 in accordance with an aspect of the invention. The gesture recognition interface system 100 can be substantially similar to the gesture recognition interface system 10 in the example of FIG. 1. As such, reference is to be made to the example of FIG. 1 in the following discussion of the example of FIG. 4.

The gesture recognition interface system 100 includes the controller 22, the projector 12, the first camera 14, and the second camera 16. As described above, the projector 12 is configured to interleave the projection of visible light and colorless light. The visible light can be light that is projected to display visible images onto the background surface 18, such as computer monitor data. The controller 22 can thus provide image data 102 to the projector 12 that corresponds to the visible images that are projected onto the background surface 18 with which the user(s) can interact. The colorless light can be non-visible light, such as IR light, that is projected for gesture recognition interaction. Accordingly, the cameras 14 and 16 can each be timed to capture an image of the background surface 18 at each instant of the projection of the colorless light for gesture recognition, as described in greater detail below.

The controller 22 includes the automated calibration unit 24. As described above in the example of FIG. 3, the automated calibration unit 24 is configured to calibrate the gesture recognition interface system 10 in a manner that is transparent to the user(s) of the gesture recognition interface system 10. As an example, the automated calibration unit 24 can be configured to initiate a calibration procedure in response to a manual input, such as an input provided from a user of the gesture recognition interface system 100. For example, a user of the gesture recognition interface system 100 can provide the manual input upon setup of the gesture recognition interface system 100 to provide an initial calibration of the gesture recognition interface system 100.

In addition to the manual calibration of FIG. 1, the automated calibration unit 24 includes a timer 104 that can be configured to periodically initiate a calibration procedure. The timer 104 can be programmed with a preset time, such that the automated calibration unit 24 is configured to initiate the calibration procedure at each expiration of the preset time. The preset time can be provided by a user of the gesture recognition interface system 100, and can be dynamically adjustable.

Upon the initiation of a calibration procedure, the automated calibration unit 24 provides a predefined calibration pattern 106 to the projector 12. As such, the projector 12 can project the predefined calibration pattern 106 onto the background surface 18 in the colorless light. As an example, the predefined calibration pattern can include a grid, an array of dots, and/or any of a variety of patterns having distinct and clearly ascertainable features. The cameras 14 and 16 can thus capture images of the predefined calibration pattern 106, such that the precise pixel locations of the features of the predefined calibration pattern 106 can be correlated with precise two-dimensional locations on the background surface 18, as described in greater detail below.

During a gesture recognition period 62, as described in the example of FIG. 2 above, the first camera 14 and the second camera 16 each receive a plurality of images that are captured during the projection of the colorless light. The respective images are provided to a digitizer 108 that is configured to generate digitized versions of the images of the sensorless input object 20. The digitized images of the sensorless input object 20 are input to an image comparator 110. The image comparator 110 compares each of the digitized images of the sensorless input object 20 to a previously stored digitized image of the sensorless input object 20 to generate a contrast enhanced binarized silhouette image of the sensorless input object 20. Such a comparison allows for an improved quality of the digitized images when the illumination of the background surface 18, such as the IR illumination in the example of FIG. 1, is not uniform across the background surface 18. The previously stored digitized image could have been captured during a calibration procedure and/or from repeatedly storing the digitized image in memory buffers. As an example, a background model can be maintained for each of the cameras 14 and 16 without the sensorless input object 20 being present.

The background model images can be used to decide at each pixel whether the silhouette images of the sensorless input object 20 correspond with a binary 1 or 0. In the above described example of the sensorless input object 20 being a silhouette object in the foreground of an illuminated background, at each pixel location, if the sensorless input object 20 silhouette image has a value that is approximately less than the corresponding background model image times a threshold scaling value of between 0 and 1, the output value will be a binary 1, thus denoting the presence of the sensorless input object 20. In this manner, the scaling value can be selected to provide an optimal balance between desirably detecting the sensorless input object 20 while being substantially insensitive to residual shadows cast on the screen by an opposing source of illumination for the background surface 18.

The contrast enhanced binarized silhouette images of the sensorless input object 20 are then each input to an object detection algorithm device 112. The object detection algorithm device 112 can be an integrated circuit (IC) or set of ICs within the controller 22, or could be a software routine residing in the controller 22. The object detection algorithm device 112 can include any of a variety of detection algorithms for determining a two-dimensional location of the sensorless input object 20 relative to the background surface 18. As an example, because the location of each of the pixels that are projected onto the background surface can be identified by the controller 22 based on the calibration procedure, as described above, the object detection algorithm device 112 can determine which of the pixels are covered by the silhouette image of the sensorless input object 20. As another example, the object detection algorithm device 112 can include a two-dimensional Laplacian of Gaussian convolution filter that applies a mathematical algorithm to each of the digitized images of the sensorless input object 20 to determine the location of one or more end-points of the sensorless input object 20, such as fingertips, in two-dimensional space.

The composite data and/or images that are provided by the object detection algorithm devices 112 are input to a calibration data and location resolver 114. The calibration data and location resolver 114 determines a three-dimensional location of the sensorless input object 20 at a given time. As an example, the calibration data and location resolver 114 can be configured to compare the relative two-dimensional locations of the images of the sensorless input object 20 provided by each of the cameras 14 and 16 and to interpolate a three-dimensional location of the sensorless input object 20 based on a parallax separation of the respective images. The gesture recognition interface system 100 can be calibrated to identify the amount of physical separation of the two-dimensional images that corresponds to a height of the sensorless input object 20 relative to the background surface 18. Accordingly, a given value of separation could correspond to a height of zero, thus denoting a touch of an endpoint of the sensorless input object 20 (e.g., the user's fingertip) to the background surface 18.

In addition, the calibration data and location resolver 114 can be configured to receive an input 115 from the automated calibration unit 24 that signifies a calibration procedure. The input 115 can include information that corresponds to precise pixel locations of the features (e.g., dots, lines, intersections) of the predefined calibration pattern 106. The calibration data and location resolver 114 can thus be configured to receive the images of the predefined calibration pattern 106, as projected onto the background surface 18, and to associate the physical locations of the features of the projected predefined calibration pattern 106 with the information provided from the automated calibration unit 24. Accordingly, the calibration data and location resolver 114 can maintain a correlation between the three-dimensional physical location of the sensorless input object 20 relative to the projected image data 102, thus providing accurate interaction between the gestures provided by users and the image data 102.

The data output from the calibration data and location resolver 114 is input to a gesture recognition device 116. The gesture recognition device 116 interprets the three-dimensional location data associated with the sensorless input object 20 and translates changes in the location data into an input gesture. For example, the gesture recognition device 116 could translate two-dimensional motion of the sensorless input object 20 across the background surface 18 as a gesture associated with mouse cursor movement. The gesture recognition device 116 could also translate a touch of the background surface 18 as a gesture associated with a mouse left-button click. Because the gesture recognition device 116 implements the location data associated with the sensorless input object 20, it can be programmed to recognize any of a variety of gestures that utilize one or more fingertips of the user's hand. In this way, the gesture recognition interface system 100 has a much more versatile input capability than touch sensitive screens.

As an example, gestures that use multiple fingertips, or even fingertips from both hands, can be interpreted as input gestures that simulate zoom commands, rotate or "twist" commands, or even environment adjustments, such as volume and brightness control, all of which can be programmed for interpretation by the gesture recognition device 116. The gesture recognition device 116 can also be programmed to recognize gestures from multiple users simultaneously. For example, the gesture recognition device 116 can provide multi-point control capability, such that coordinated actions between two hands and/or between multiple users can be implemented. Furthermore, the gesture recognition device 116 can work in conjunction with other computer input devices, such as a conventional mouse or keyboard, to provide additional types of gesture inputs. In addition, the simulated commands may not even require touching the background surface. For example, a user could simulate a mouse left-click by rapidly moving his or her finger in a downward then upward direction in the space above the background surface, such that the gesture recognition device 116 evaluates not only changes in the three-dimensional location of the fingertip, but also a time threshold associated with its motion. Moreover, any of a variety of input gestures could be formed from six-degree of freedom motion based on changes in three-dimensional location and orientation of the sensorless input object 20 and any associated end-points.

The controller 22 could also include a predefined gesture memory 118 coupled to the gesture recognition device 116. The predefined gesture memory 118 could include a plurality of predefined gestures, with each of the predefined gestures corresponding to a particular device input. For example, the predefined gesture memory 118 could include a database of specific arrangements and combinations of fingertip positions and motions that each correspond to a different computer input. The gesture recognition device 116, upon receiving the three-dimensional location data associated with the one or more end-points of the sensorless input object 20 over a given time, could poll the predefined gesture memory 118 to determine if the gesture input matches a predefined gesture. Upon determining a match, the gesture recognition device 116 could translate the gesture input into the device input that corresponds to the predefined gesture. The predefined gesture memory 118 could be pre-programmed with the appropriate predefined gesture inputs, or it could be dynamically programmable, such that new gestures can be added, along with the corresponding device inputs. For example, a user could activate a "begin gesture sample" operation, perform the new gesture, capture the appropriate images of the new gesture using the first camera 14 and the second camera 16, and input the appropriate device input for which the new gesture corresponds.

It is to be understood that a given gesture recognition interface system is not intended to be limited by the example of FIG. 4. Other implementations are possible for providing inputs in accordance with an aspect of the invention. For example, one or more of the devices in the controller 22 could be integral with other devices, or could be separate from the controller 22. For example, the cameras 14 and 16 could each input their respective images to a common digitizer 108. In addition, some of the devices in the controller 22 may not be necessary. As an example, the function of the image comparator 110 may be obviated based on the type of object detection algorithm that is implemented in the object detection algorithm device 112. Accordingly, the example of FIG. 4 is but one of a variety of ways of providing inputs in accordance with an aspect of the invention.

Figure 5:
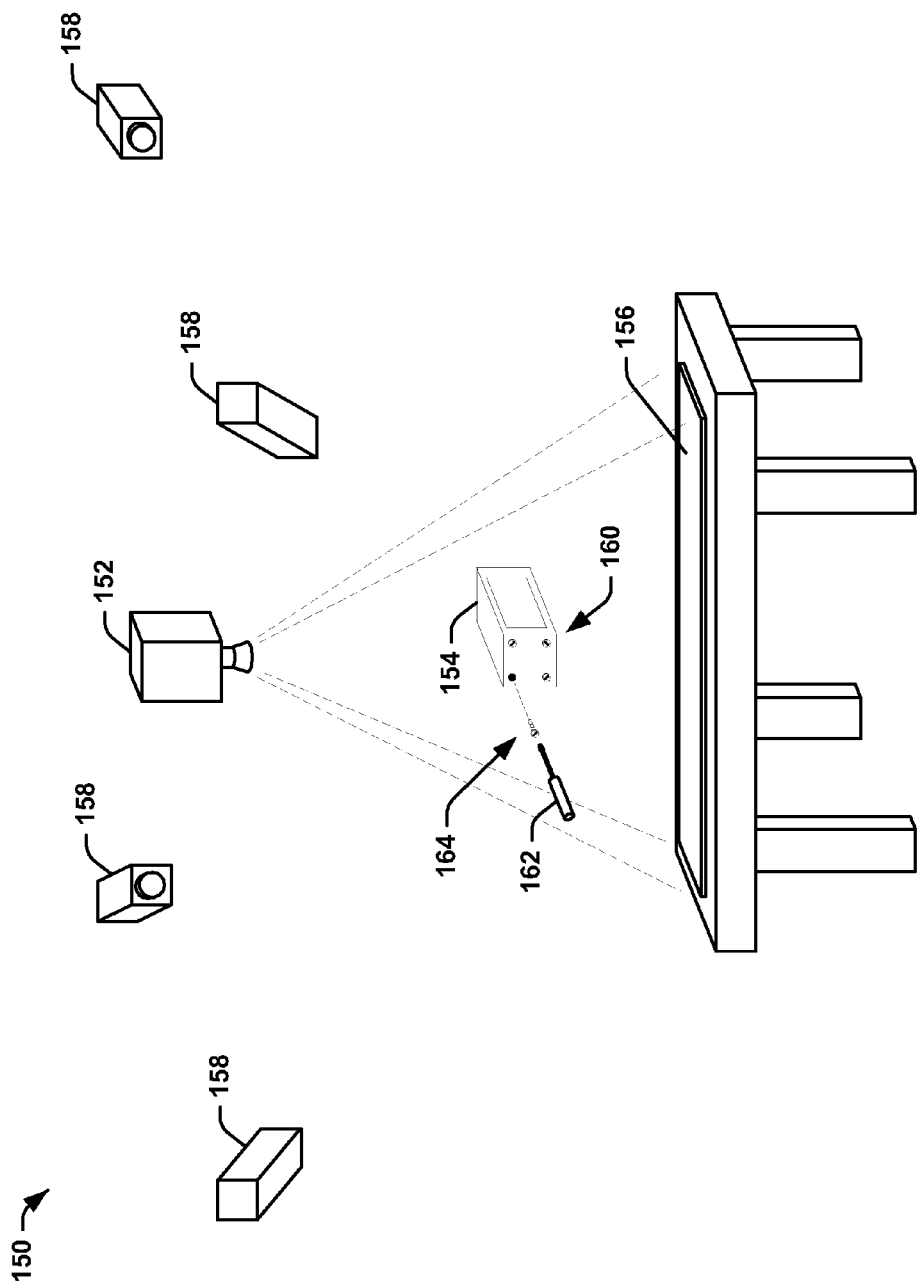
FIG. 5 illustrates an example of a gesture recognition simulation system in accordance with an aspect of the invention.

FIG. 5 illustrates an example of a gesture recognition simulation system 150 in accordance with an aspect of the invention. The gesture recognition simulation system 150 includes a three-dimensional display system 152, demonstrated in the example of FIG. 5 as a holograph projector. In the example of FIG. 5, the three-dimensional display system 152 projects a holographic image of a simulated object 154. The simulated object 154 is thus a visible image with which a user of the gesture recognition simulation system 150 can interact. The three-dimensional display system 152 is demonstrated in the example of FIG. 5 as being mounted directly above a background surface 156. The three-dimensional display system 152 can also interleave the projection of colorless light, such as IR light, with the projection of the holographic image of the simulated object 154. Therefore, the colorless light can be illuminated onto the background surface 156.

The gesture recognition simulation system 150 includes four cameras 158, each of which may include a respective filter for the type of colorless light. Accordingly, the cameras 158, the background surface 156, and an associated controller (not shown) collectively form a gesture recognition interface system, such as the gesture recognition interface system 10 in the example of FIG. 1. Therefore, a user can provide input gestures to interact directly with the holographic image of the simulated object 154. In addition, the holographic image of the simulated object 154 can include a plurality of functional components 160, demonstrated in the example of FIG. 5 as screws attached to an end of the simulated object 154.

A sensorless input object 162 can be used to provide input gestures over the background surface 156. To provide the interaction between the sensorless input object 162 and the given functional component 160, the controller (not shown) can detect a three-dimensional physical location of a feature of the sensorless input object 162. For example, the controller could determine the three-dimensional physical location of a feature (e.g., endpoint) of the sensorless input object 162. Upon determining a correlation of the physical locations of the sensorless input object 162 and a given functional component 160, the controller can determine a gesture motion associated with the sensorless input object 162 to determine if it corresponds with a predefined action associated with the functional component 160. Upon determining that the input gesture corresponds with the predefined action, the simulation application controller can command the three-dimensional display system 152 to output the appropriate simulated action.

In the example of FIG. 5, the sensorless input object 162 is demonstrated as a screwdriver. FIG. 5 demonstrates that the screwdriver 162 is being used to interact with one of the functional components 160, a screw 164. The controller can compare the three-dimensional location of the end-point of the screwdriver 162 with the location of the screw 164. Upon determining a correlation of the physical locations of the end-point of the screwdriver 162 and the screw 164, the controller can determine a gesture motion associated with the screwdriver 162 to determine if it corresponds with a predefined action associated with the functional component. As the user may be providing an unscrewing gesture, the simulation application controller commands the three-dimensional display system 152 to output the appropriate simulated action, which in the example of FIG. 5, is the screw 164 being unscrewed and removed from the simulated object 154.

The example of FIG. 5 is provided to demonstrate one possible simulation that can be utilized by the gesture recognition simulation system 150. By implementing the gesture recognition interface system described above in the examples of FIGS. 1-3, a variety of other simulations can be achieved in accordance with an aspect of the invention. As such, the gesture recognition simulation system 150 is not intended to be limited to the example of FIG. 5.

Figure 6:
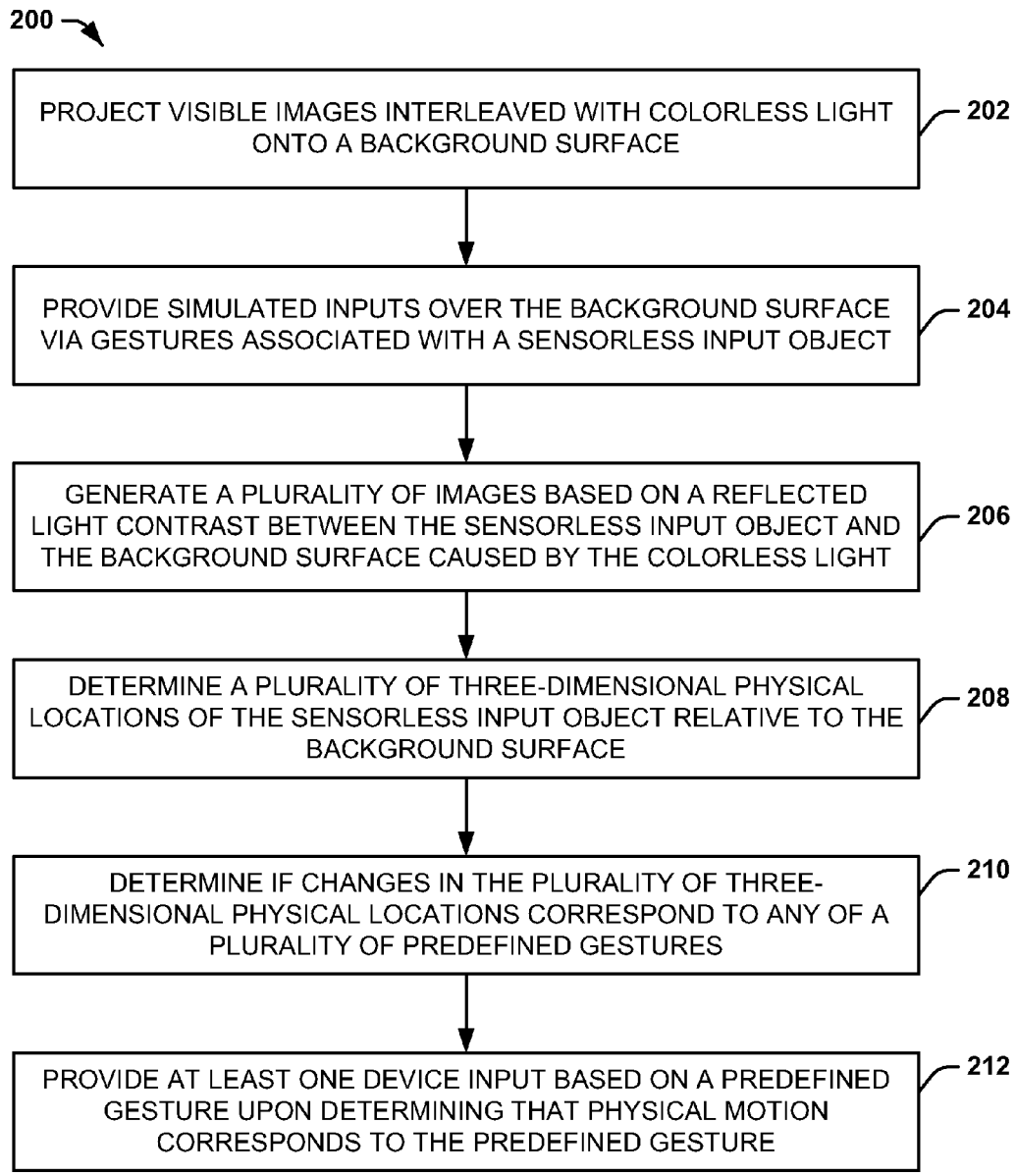
FIG. 6 illustrates an example of a method for providing inputs to a computer in accordance with an aspect of the invention.

In view of the foregoing structural and functional features described above, a methodology in accordance with various aspects of the present invention will be better appreciated with reference to FIG. 6. While, for purposes of simplicity of explanation, the methodologies of FIG. 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 200 for providing inputs in accordance with an aspect of the invention. At 202, visible images that are interleaved with colorless light are projected onto a background surface. The colorless light could be non-visible light, and could be IR light. The background surface could be a reflective surface. The background surface could also be an output display, such that it displays the visible images as computer monitor data. At 204, simulated inputs are provided over the background surface via gestures associated with a sensorless input object. The sensorless input object could be the user's hand, such that the user simulates the inputs via hand gestures. In addition, the simulated inputs could be simulated mouse inputs, zoom commands, or rotate commands.

At 206, a plurality of images of the sensorless input object are generated based on a reflected light contrast between the sensorless input object and the illuminated background surface of the colorless light. The plurality of images could be a plurality of matched pairs of images, such that each image of the matched pair corresponds to the sensorless input object from a different perspective at substantially the same time. In the example of a reflective background surface, the background surface could appear to be much brighter than the user controlled sensorless input object. Therefore, the plurality of images could be silhouette images of the user controlled sensorless input object. Alternatively, the background surface could be far away, or IR dampening, such that the user controlled sensorless input object appears brighter. Therefore, the plurality of images could be illuminated images.

At 208, a plurality of three-dimensional physical locations of the sensorless input object are determined relative to the background surface. For example, a three-dimensional location of the sensorless input object can be determined by interpolating a first image associated with a first camera and a second image associated with a second camera. At 210, it is determined whether the physical motion associated with the sensorless input object corresponds to any of a plurality of predefined gestures. Changes in location of the three-dimensional location of at least one end-point of the sensorless input object could be determinative of the physical motion of the sensorless input object. The predefined gestures could be stored in a memory. Each predefined gesture could be associated with a different device input.

At 212, at least one device input is provided based on determining that the changes in the three-dimensional locations associated with the sensorless input object corresponds to a given one of the predefined gestures. Device inputs could be mouse inputs, such that two-dimensional motion across the background surface could simulate motion of a mouse cursor, and a touch of the background surface could simulate a mouse left-click. In addition, motion associated with multiple end-points could provide different types of inputs, such as rotate and zoom commands.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A gesture recognition interface system comprising:
   a projector configured to project invisible light and visible images onto a background surface, the projection of the invisible light being interleaved with the projection of the visible images;
   at least one camera configured to receive a plurality of images based on a reflected light contrast difference between the background surface and a sensorless input object during projection of the invisible light; and
   a controller configured to determine a given input gesture based on changes in relative locations of the sensorless input object in the plurality of images, and being further configured to initiate a device input associated with the given input gesture.

2. The interface system of claim 1, wherein the invisible light is infrared (IR) light.

3. The interface system of claim 2, wherein the projector is configured as a digital light projection (DLP) projector comprising a color wheel that includes a plurality of visible light lenses and an IR lens.

4. The interface system of claim 1, further comprising an automated calibration component configured to provide a calibration pattern via the projector onto the background surface during projection of the invisible light, the calibration pattern being projected in the invisible light, the controller being configured to associate the calibration pattern with known pixel locations.

5. The interface system of claim 4, wherein the automated calibration component is further configured to calibrate the gesture recognition interface system based on a user input.

6. The interface system of claim 4, wherein the automated calibration component is further configured to calibrate the gesture recognition interface system at each of periodic time intervals.

7. The interface system of claim 1, wherein the sensorless input object is a user's hand.

8. The interface system of claim 1, wherein the controller is further configured to determine a three-dimensional physical location of the sensorless input object, and wherein the given input gesture is associated with changes in the three-dimensional physical location of the sensorless input object.

9. The interface system of claim 1, wherein the projector is configured as a holograph projector, such that the visible images are three-dimensional holographic images.

10. The interface system of claim 1, wherein the background surface is configured as a display device for the visible images, such that the background surface operates as a touch-screen input/output device with respect to a given gesture input performed in a three-dimensional gesture recognition environment in a foreground of the background surface.

11. The interface system of claim 1, wherein the at least one camera comprises at least one pair of cameras, and wherein the controller determines a three-dimensional physical location of the sensorless input object in a three-dimensional gesture recognition environment in a foreground of the background surface based on an amount of parallax separation between matched pairs of images of the sensorless input object.

12. A method of providing device inputs, the method comprising:
   projecting invisible light interleaved with visible images onto a background surface;
   providing simulated inputs over the background surface via gestures associated with a sensorless input object;
   generating a plurality of images associated with the sensorless input object based on a reflected light contrast between the sensorless input object and the invisible light;
   determining a plurality of three-dimensional physical locations of the sensorless input object relative to the background surface;
   determining if changes in the plurality of three-dimensional physical locations of the sensorless input object correspond to a given one of a plurality of predefined gestures; and
   providing at least one device input based on determining that the changes in the plurality of three-dimensional physical locations of the sensorless input object correspond to the given one of the plurality of predefined gestures.

13. The method of claim 12, wherein projecting the invisible light interleaved with visible images comprises projecting infrared (IR) light and the visible images from a DLP projector comprising a color wheel that includes a plurality of visible light lenses and an IR lens.

14. The method of claim 12, wherein projecting the invisible light comprises:
   projecting a calibration pattern onto the background surface during projection of the invisible light the calibration pattern being projected in the invisible light; and
   correlating pixels associated with the calibration pattern with physical space relative to the background surface.

15. The method of claim 14, wherein projecting the calibration pattern comprises projecting the calibration pattern in response to an elapsed periodic time.

16. The method of claim 12, wherein generating a plurality of images comprises generating a first plurality of images associated with a first camera and generating a second plurality of images associated with a second camera, and wherein determining the plurality of three-dimensional physical locations of the sensorless input object comprises determining a height of the sensorless input object relative to the background surface based on an amount of parallax separation between the first plurality of images and the second plurality of images of the sensorless input object.

17. A gesture recognition interface system comprising:
    means for projecting invisible light interleaved with visible images onto a background surface;
    means for generating a plurality of images of a sensorless input object based on a brightness contrast between the background surface and the sensorless input object;
    means for generating three-dimensional location information associated with the sensorless input object based on the plurality of images of the sensorless input object;
    means for translating changes in the three-dimensional location information associated with the sensorless input object to a given input gesture; and
    means for providing device inputs based on matching the given input gesture with one of a plurality of predefined gestures.

18. The interface system of claim 17, wherein the means for projecting invisible light comprises means for projecting a calibration pattern onto the background surface while projecting the invisible light the calibration pattern being projected in the invisible light, the system further comprising means for calibrating the gesture recognition interface system based on the calibration pattern.

19. The interface system of claim 18, wherein the means for projecting the calibration pattern is configured to project the calibration pattern at expiration of a predefined elapsed time.

20. The interface system of claim 17, wherein the invisible light is infrared (IR) light.

* * * * *